(12) United States Patent
Estigoy

(10) Patent No.: US 9,451,821 B1
(45) Date of Patent: Sep. 27, 2016

(54) LOCKABLE BELT CLIP

(71) Applicant: Rommel R. Estigoy, Tacoma, WA (US)

(72) Inventor: Rommel R. Estigoy, Tacoma, WA (US)

( * ) Notice: Subject to any disclaimer, the term of this patent is extended or adjusted under 35 U.S.C. 154(b) by 0 days.

(21) Appl. No.: 14/756,621

(22) Filed: Sep. 26, 2015

Related U.S. Application Data

(62) Division of application No. 13/573,482, filed on Sep. 18, 2012, now abandoned.

(60) Provisional application No. 61/628,437, filed on Oct. 31, 2011.

(51) Int. Cl.
| | | |
|---|---|---|
| *A45F 5/00* | (2006.01) | |
| *A45C 1/04* | (2006.01) | |
| *F41C 33/02* | (2006.01) | |
| *A45F 5/02* | (2006.01) | |
| *F16B 2/24* | (2006.01) | |
| *A45F 3/00* | (2006.01) | |
| *A45F 5/10* | (2006.01) | |

(52) U.S. Cl.
CPC ............. *A45F 5/021* (2013.01); *A45F 3/005* (2013.01); *F16B 2/245* (2013.01); *A45F 5/102* (2013.01); *A45F 2200/0558* (2013.01)

(58) Field of Classification Search
CPC .......... A45F 5/102; A45F 2200/0558; A45F 5/021; A45F 5/02; A45F 5/00; A45F 3/005; Y10T 24/44752; Y10T 24/1379; Y10T 24/4453; Y10S 24/60; F16B 2/245; F41C 33/041
USPC ................. 224/667, 669, 666, 269
See application file for complete search history.

(56) References Cited

U.S. PATENT DOCUMENTS

| | | | |
|---|---|---|---|
| 1,129,361 A * | 2/1915 | Perry | A41F 15/02 132/278 |
| 2,823,434 A | 12/1958 | Van Buren, Jr. | |
| 2,869,198 A | 1/1959 | Clevett, Jr. | |
| 4,214,686 A | 7/1980 | Dostourian | |
| 4,342,140 A | 8/1982 | Lacey | |
| 4,974,764 A * | 12/1990 | Cantwell | A45F 5/02 224/269 |
| 5,109,576 A * | 5/1992 | Teekell | B65D 33/1675 24/30.5 P |
| 7,007,352 B1 * | 3/2006 | Hill | A45F 5/02 24/3.1 |
| 7,774,864 B2 * | 8/2010 | Carlson | A41D 13/0012 2/249 |
| 7,971,762 B2 * | 7/2011 | Clifton, Jr. | A45F 5/02 224/197 |
| 2007/0278270 A1 | 12/2007 | Castanada | |
| 2010/0306972 A1 * | 12/2010 | Miltner | A45F 5/02 24/457 |

* cited by examiner

*Primary Examiner* — Justin Larson
*Assistant Examiner* — Lester L Vanterpool
(74) *Attorney, Agent, or Firm* — Brian J. Coyne

(57) ABSTRACT

A resilient clip mountable to a Load Bearing Equipment (LBE) waist belt for suspending pouches or other articles therefrom, including MOLLE-compatible pouches and accessories. A first embodiment of the clip has a single, first lock to secure an article to the clip and the clip to a belt, and includes a front panel and a rear panel joined by a first bight. When closed, a second bight at a lower end of the rear panel surrounds and captures a third bight at a lower end of the front panel. A second embodiment of the clip adds to the first embodiment a second lock that, when in locked condition, prevents unlocking the first lock. Accessories for attaching to the clip a six-inch mini flashlight, a 3½" mini flashlight, a leather pouch, and a nylon pouch are also disclosed.

10 Claims, 17 Drawing Sheets

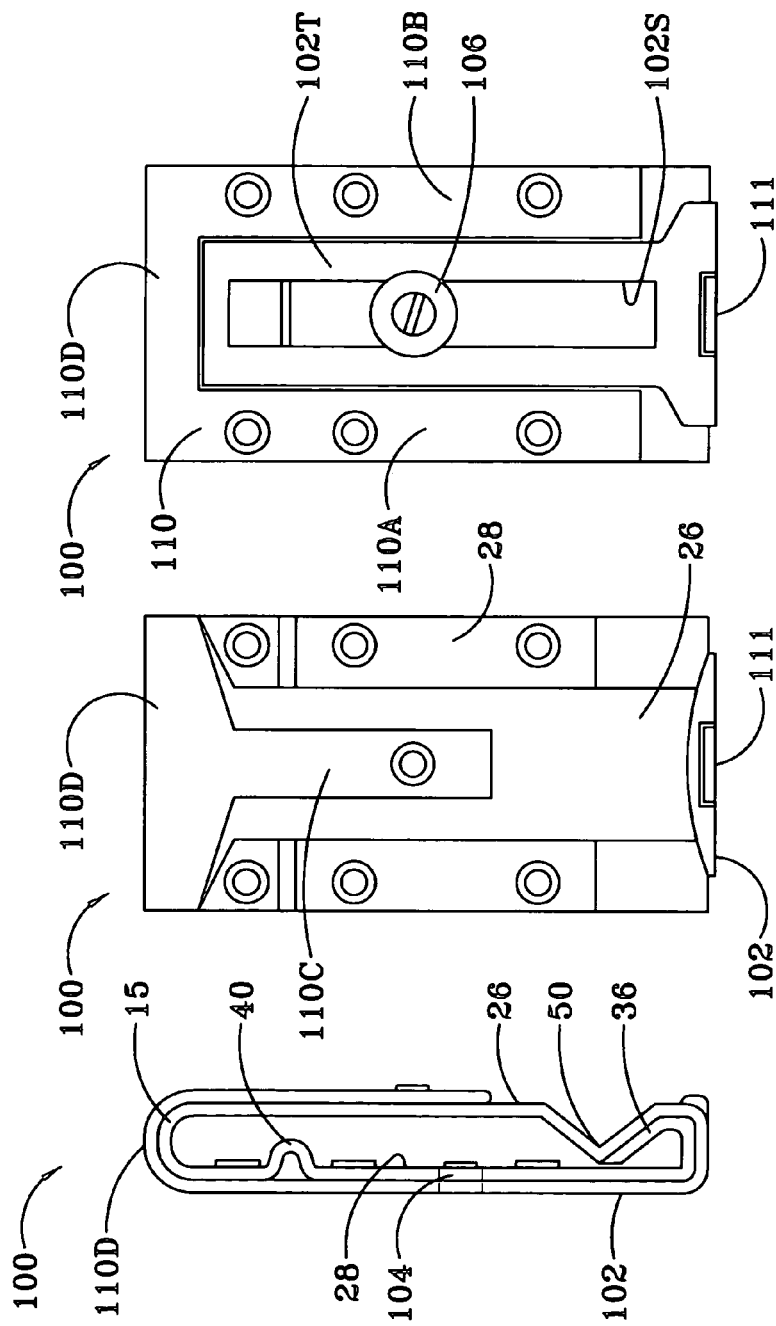

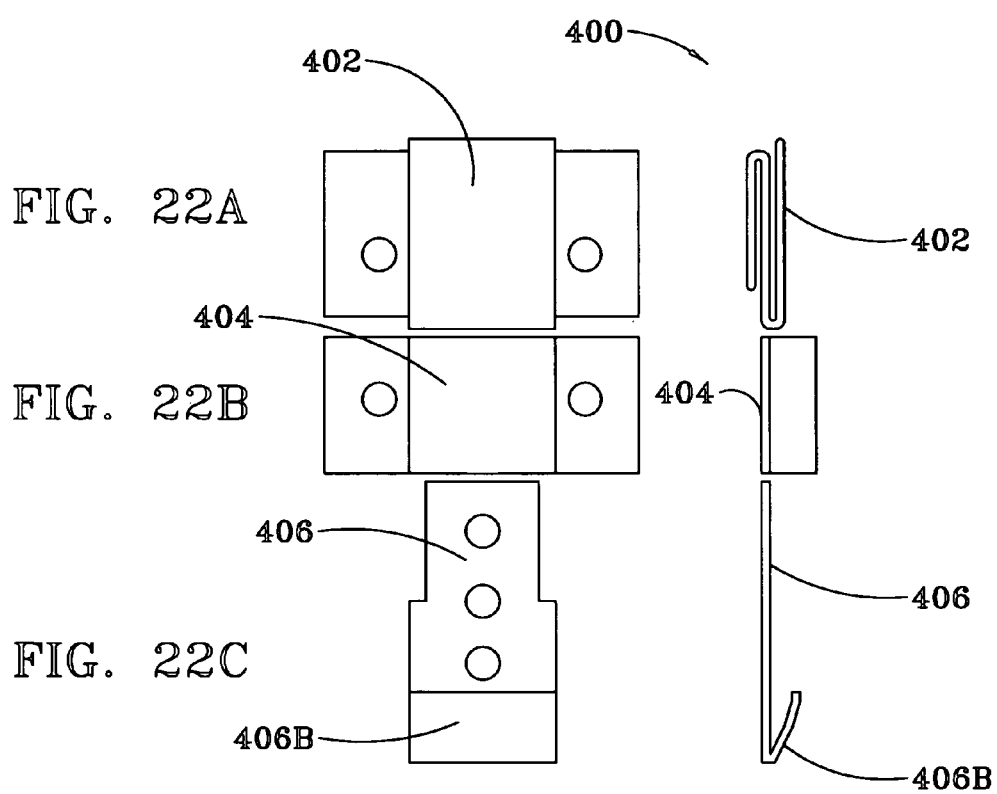

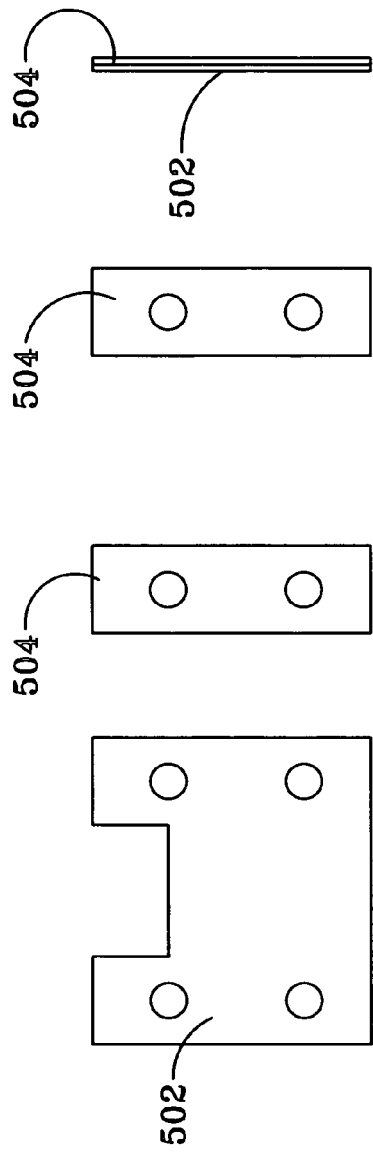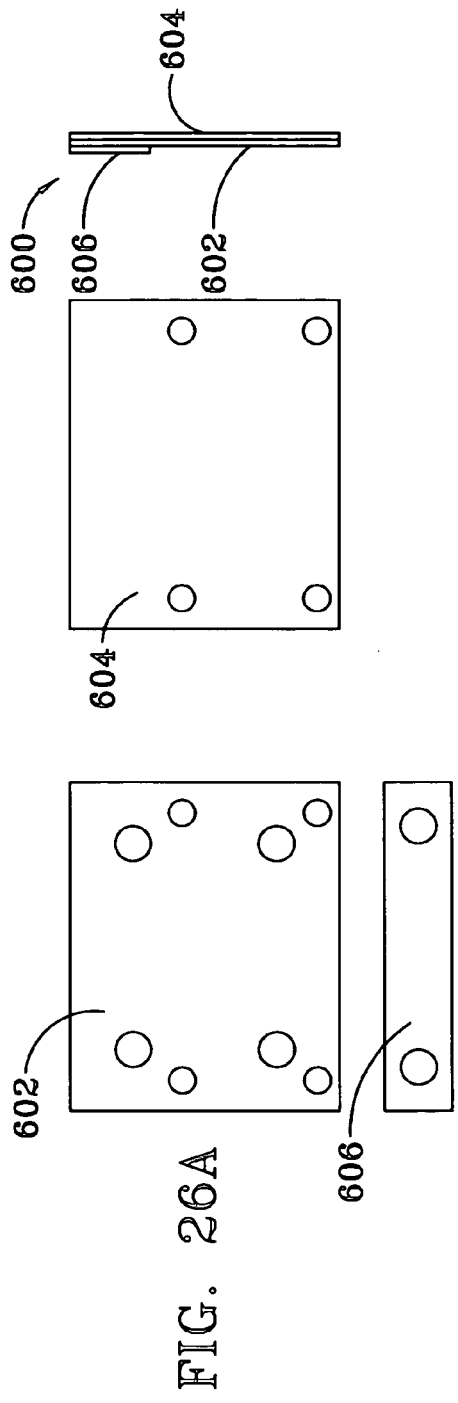

LOCKABLE BELT CLIP

CROSS-REFERENCE TO RELATED PATENT APPLICATIONS

This is a divisional of U.S. patent application Ser. No. 13/573,482 filed on Sep. 18, 2012. This application claims the benefit of provisional application No. 61/628,437 by the same applicant for the same invention, filed on Oct. 31, 2011.

STATEMENT REGARDING FEDERALLY APPROVED RESEARCH OR DEVELOPMENT

None.

BACKGROUND OF THE INVENTION

1. Field of the Invention

The present invention relates generally to a clip that is mountable to a waist belt for suspending a pouch, knife sheath, flashlight or other article from the belt. More particularly, the invention relates to a resilient, lockable clip that is mountable to both a one-inch and a two-inch wide, load bearing equipment ("LBE") waist belt and, using a Modular Lightweight Load-carrying Equipment ("MOLLE") attachment system, can suspend MOLLE-compatible pouches and accessories from the belt.

2. Background Art

Clips have long been in use for attaching various kinds of items to a waist belt, such as a pouch or sheath that houses a multitool, knife, cell phone, flashlight, GPS device or other item (collectively referred to here as "retainable items") that a sportsman, soldier or building trades workman (e.g., carpenter, plumber, electrician) may wish to suspend from his waist belt. Comprised of a resilient material, such clips have commonly included front and rear panels joined by a top bight that was shaped and dimensioned to overlie an upper edge of a waist belt. Such clips have further included a lock disposed at lower ends of the front and rear panels such that the clip could, when unlocked, form an open loop for attaching a retainable item and, when locked, form a closed loop for retaining said retainable item on the clip while simultaneously securing the clip to the belt. Exemplary of such lockable belt clips is the carrying clip disclosed in U.S. Pat. No. 2,551,019 to Pierre, wherein, to lock and unlock the clip, a hook end of a front panel thereof could, by manipulating an adjacent release tab, be alternately moved into and out of engagement with a shoulder portion of a rear panel thereof, respectively. In U.S. Pat. No. 2,869,198, Clevett disclosed a bolt slidably mounted to a rear panel of a belt clip which, when slid down and inserted into a slot at a lower end of the front panel, locked the clip. A similar lockable clip was disclosed by Van Buren, Jr. in U.S. Pat. No. 2,823,434.

In order to reduce the chance of an inadvertent opening of his clip, in U.S. Pat. No. 4,342,140 Lacey disclosed a clip having a keeper and locking means that required the simultaneous application of a plurality of forces originating from different directions in order to unlock the keeper and thereby unlock the clip In U.S. patent application 2007.0278270 A1, Castaneda disclosed a locking belt clip intended for attaching a portable electronic device to a waist belt. His clip pivotably attached an upper end portion of a rear panel or support arm to an upper end portion of a front panel or securement arm. A lower end of the support arm terminated in a barbed flange having a transverse capture channel. A lower portion of the support arm included a curved finger that terminated at a lower end thereof in an offset. When the clip was in closed position, the offset was lodged within the capture channel and secured therein by spring bias. The clip was opened by moving the offset rearward against the spring bias, which movement permitted the securement arm to spring forward, free from the support arm.

In U.S. Pat. No. 4,214,686, Dostourian disclosed a lockable belt clip comprising metallic wire bent to form two substantially parallel loops having extensions in the form of substantially parallel arms. The arms, and the loops that joined the arms, were intended to fit around a military serviceman's waist belt. Free ends of the wire were formed into ears that could pass between one pair of parallel arms and snap back behind the arms to lock the clip. A latch, also formed of wire, was slidable along the arms to latch and unlatch the arms.

These and other prior art lockable belt clips have had certain limitations and deficiencies, however, which the present invention is intended to overcome, as follows.

Insufficient Strength of Attachment of a Clip to a Waist Belt:

Vigorous jostling motions of prior art waist belt clips, incurred as a user was running, jumping, crawling along the ground, or in hand-to-hand combat, could sometimes cause the clip to shift position along the user's belt, causing the retained item to be difficult or impossible for the user to reach and grasp at that point in time.

Not Compatible with MOLLE-Compatible Pouches and Accessories:

The term Modular Lightweight Load-carrying Equipment is used to define the current generation of load-bearing equipment and rucksacks utilized by the United States armed forces. The system uses a Pouch Attachment Ladder System ("PALS"), which is a grid of webbing that is used to attach smaller equipment onto load-bearing platforms, such as vests and backpacks. In the military, PALS is used to attach items to a serviceman's body, such as knife sheathes, ammunition magazine pouches, radio pouches, and holsters. PALS consists of webbing sewn onto the load-bearing equipment and corresponding webbing and straps on the attachment. The straps are interwoven between the webbing on each of two pieces and then snapped into place. As required by current military specifications, a PALS grid consists of horizontal rows of one-inch nylon webbing, vertically spaced one inch apart, and attached to a backing at 1.5 inch intervals. MOLLE-compatible pouches and accessories are each provided with a pair of straps that are appropriately spaced apart for insertion through, and retention within, the nylon webbings of a PALS grid. For instance, for attachment to a PALS grid, a standard, nylon multitool pouch includes a two-inch wide top loop strap and, spaced vertically apart by 1.75 inches therefrom, a two-inch wide bottom loop strap. The prior art lockable belt clips made no provision for easy and secure attachment to such loop straps, and they were made either too wide or too narrow.

Not Adapted for Secure Attachment to the Current Range of Widths of LBE Belts:

The width of Load Bearing Equipment waist belts generally ranges from one to two and one-fourth inches, and it is a desirable that a single clip should be universal in the sense that it should be easily and securely attachable to any LBE belt having a width within that range. It appears, however, that prior to the present invention, no lockable prior art waist belt clip has been disclosed that could be easily and securely attached to such a wide range of widths of LBE waist belts.

Too Noisy:

Removing most lockable prior art clips, such as those that use hook-and-loop fasteners (VELCRO®), from a waist belt creates a noticeable sound, which can be highly undesirable in game hunting and military battlefield contexts.

Two Hands Required to Attach and Remove:

It is a desirable feature that a lockable waist belt clip be easily attached to, and removable from, a belt with one hand only; whereas, most lockable, prior art waist belt clips have required use of both hands to attach and remove the clip from a waist belt.

SUMMARY OF INVENTION

Thus, there remains a need for a resilient, lockable waist belt clip that can easily, silently, and using one hand only, be securely attached to, and disattached from, any Load Bearing Equipment (LBE) waist belt having a width between one and two and one-quarter inches. There further remains a need for such a belt clip that is adapted for attachment to MOLLE-compatible pouches and accessories. The present invention meets this need by providing a resilient, lockable, waist belt clip that, using one hand only, is easily and securely attachable to, and detachable from, an LBE waist belt having any width in the range one to two and one-fourth inches, and that is compatible with MOLLE pouches and accessories.

In a first embodiment of the invention, a single-locking clip for a Load Bearing Equipment waist belt is provided. The front and rear panels are of substantially equal size and each extends from an upper end to a lower end thereof. The upper ends of the front and rear panels are joined by a first bight, which due to the resiliency of the clip, permits the front and rear panels to be deviated about the first bight toward and away from each other whenever the clip is being locked or unlocked, respectively; that is, when the clip is in an unlocked condition and the lower ends of the front and rear panels are moved away from each other and then released, the resiliency of the material of which the clip is composed causes the lower ends of the panels to snap back together. A lower end portion of the front panel is bent rearwardly to form a second bight and extends upwardly from the second bight a distance X, thereby forming a barb.

The rear panel includes a lower end portion that terminates in a forwardly and upwardly bent third bight. The rear panel further includes a knee that extends forwardly toward the front panel. The knee is located a distance Y above the third bight, and Y is greater than X. The third bight is dimensioned and disposed to receive in surrounding engagement the second bight and the barb when the clip is in an unlocked condition and the lower ends of the front and rear panels are manually pressed toward each other, thereby capturing the second bight within the third bight and with the barb pressed up against the rear panel and captured between the third bight and the knee. From a closed condition, the clip can be easily opened with one hand by pressing down upon the second flange, which permits the second bight and the barb to escape from the third bight and the lower end of the front panel to be pulled forward, away from the lower end of the rear panel, whereupon any pouch or accessory that was mounted to the clip may be removed from the clip and/or some other pouch or accessory may be mounted on the clip. Thereafter, the clip can be closed again by merely pressing the lower ends of the front and rear panels toward each other, which causes the third bight to resiliently deform sufficiently to receive the second bight, whereupon the second bight becomes captured within the third bight and with the barb pressed against the rear panel between the third bight and the knee.

MOLLE-compatible pouches and accessories are equipped with a one-inch wide, upper strap and a one-inch wide lower strap that is spaced 1.75 inches below the upper strap. In a preferred embodiment, the single-locking clip is adapted for attaching MOLLE-compatible pouches and accessories by making the distance $Z_1$ between the transverse rib and the first bight at least two inches in order to permit insertion therein of a two-inch wide, upper strap of a MOLLE-compatible pouch or accessory; and further, by making the distance $Z_2$ between the transverse rib and the second bight sufficient to permit insertion therein of a two-inch wide, lower strap.

The clip is dimensioned to permit secure mounting of the clip to any LBE belt having width within the range of one to two and one-quarter inches. To prevent the clip from sliding along the length of a waist belt, the front panel includes a transverse rib that protrudes about one inch below the bight, rearwardly towards the rear panel. When attached to a waist belt, the transverse rib presses against the belt and prevents the clip from being slid along the belt by the kinds of jostling motions that commonly occur when the belt wearer is running, jumping, crawling along the ground, and the like.

In a second embodiment of the invention, a double-locking clip is provided. The double-locking clip includes the same component parts as the single locking clip of the first embodiment, but additional components are added to it to provide a second lock for the clip. The double-locking clip has a keep that is mounted to a front surface of the front panel for sliding motion along the front panel between an upper, retracted position and a lower, extended position. The keep includes a flat, elongated, tongue of uniform width that extends from an upper end to a lower end thereof. The tongue has an elongated slot of uniform width, extends from the upper end to the lower end of the tongue, and is closed at both ends. The keep further includes a fourth bight that is rearwardly-directed and contiguous with the lower end of the tongue. The fourth bight is shaped and dimensioned to receive in surrounding engagement the third bight when the keep is slid upwards from an extended, open position to a retracted, closed position. The double-locking clip further comprises a guide plate that includes a parallel pair of laterally spaced-apart, parallel arms disposed on opposite sides of the tongue, which arms are attached to a front surface of the front plate. Preferably, the guide plate also includes a rear brace attached to a rear surface of the rear plate and a fifth bight that joins the parallel arms of the guide plate to the rear brace. A centrally-disposed hub attached to the front plate protrudes forwardly through the slot, and a disk-shaped retainer (e.g., a washer) overlies the tongue to retain the tongue for sliding motion along a front surface of the front plate. The keep further comprises a fourth bight that extends from a lower end of the tongue rearwardly and thence upwardly. The fourth bight is shaped and dimensioned to receive and partially surround the third bight when the keep is in a retracted, closed position. Preferably, a central portion of the fourth bight has a an opening that is shaped and dimensioned to receive the third bight in close-fitting, surrounding engagement when the clip is already singly locked and the keep is slid from an extended, open position to a retracted, closed position, thereby doubly locking the clip. Accordingly, in addition to incorporating all the features and advantages of the first embodiment, the clip of the second embodiment can be doubly locked and unlocked silently and with one hand only.

Also disclosed are a 6-inch and 3½-inch flashlight carrier attachments, and first and second embodiments of a nylon pouch attachment that are attachable to the front panel of either the first or the second embodiment.

BRIEF DESCRIPTION OF THE DRAWINGS

FIG. 11 is a left side, elevational view showing the keep thereof in a retracted, locked position;

FIG. 12 is a rear, elevational view thereof;

FIG. 13 is a front, elevational view thereof;

FIG. 18B is a front, elevational view of an upper, single-tabbed scroll thereof;

FIG. 18D is a front, elevational view of a pivoting cap thereof.

FIG. 21 depicts the component parts of a nylon pouch attachment accessory for the first and second embodiments of the invention arranged in their manner of attachment to a front surface thereof;

FIG. 22A is a front, elevational view of a dual tabbed clip portion;

FIG. 22B is a front, elevational view of a bracket thereof;

FIG. 22C is a front elevational view of a lower member thereof;

FIG. 23 is a left side, elevational view of a leather pouch attachment accessory that is attachable to a front surface of the first and second embodiments of the invention, shown assembled;

FIG. 24A is a front, elevational view of a mounting plate thereof;

FIG. 24B is a front, elevational view of a first spacer thereof; and

FIG. 24C is a front, elevational view of a second spacer thereof.

FIG. 25 is a left side, elevational view of a second leather pouch attachment accessory that is attachable to a front surface of the first and second embodiments of the invention, shown assembled;

FIG. 26A is a front, elevational view of a rear mounting plate thereof;

FIG. 26B is a front elevational view of a front mounting plate thereof; and

FIG. 26C is a front elevational view of a spacer thereof.

Like numerals denote like parts throughout the several views.

DETAILED DESCRIPTION

Figure 1:
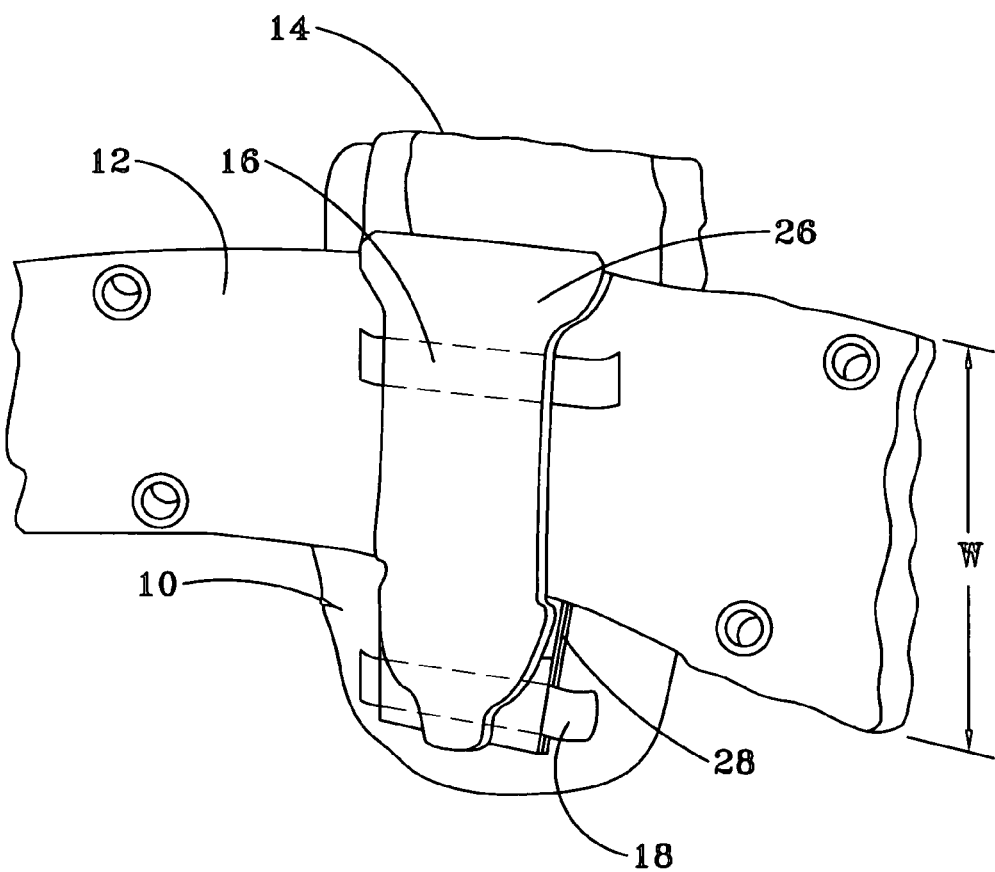
FIG. 1 is rear, perspective view of a first embodiment of the present invention mounted on a Load Bearing Equipment (LBE) belt of width W and of a MOLLE-compatible pouch attached thereto.
Figure 2:
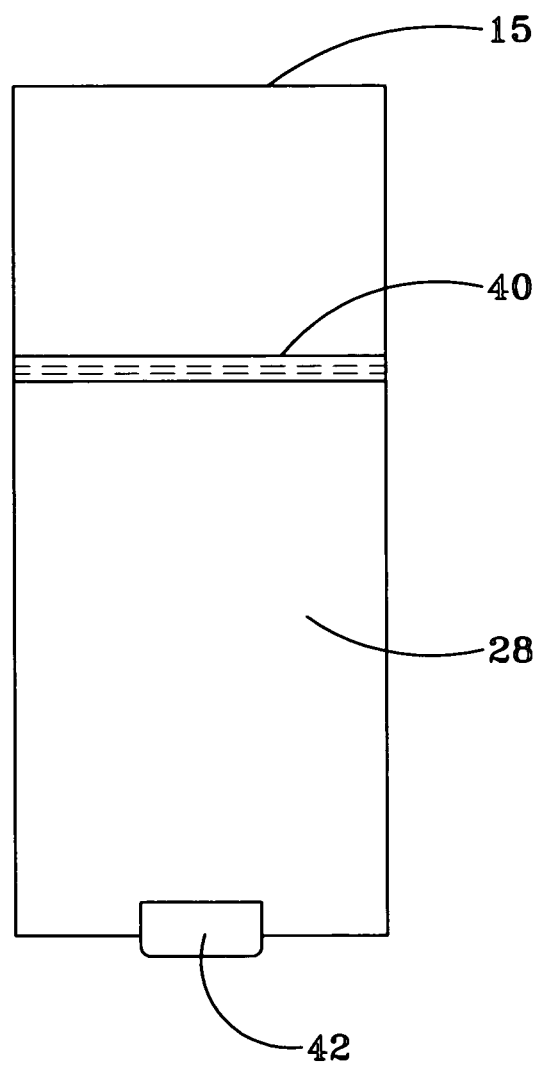
FIG. 2 is a front, elevational view of the first embodiment of the invention, depicted as locked.
Figure 3:
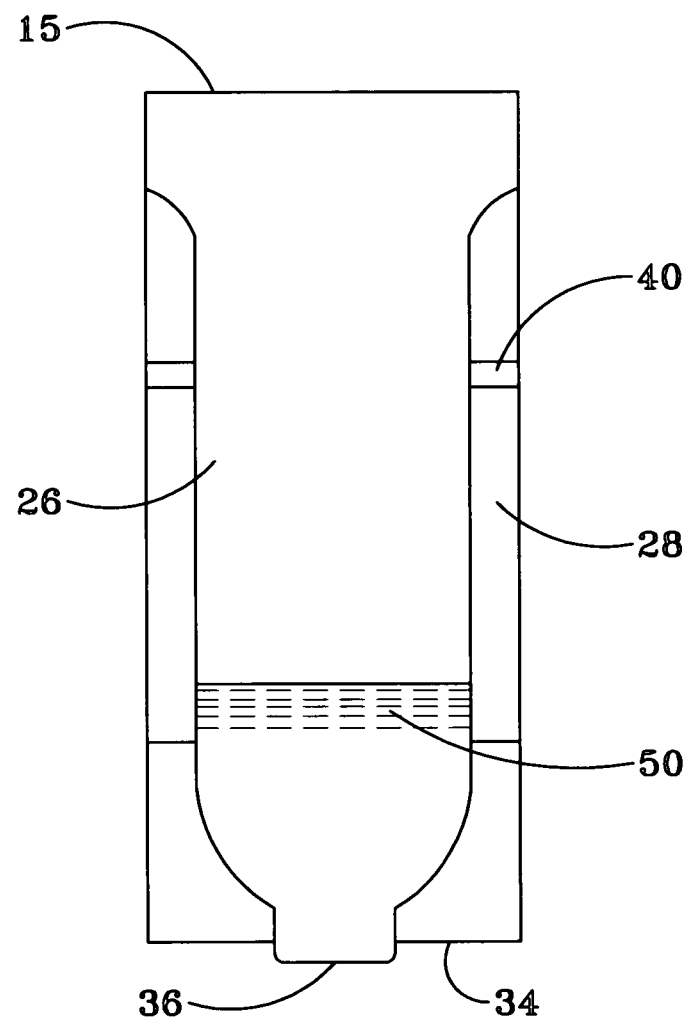
FIG. 3 is a rear, elevational view thereof.

Referring to FIG. 1, a single locking, first embodiment of the waist belt clip of the present invention, denoted generally by the numeral 10, is shown in use, locked and attached to a two-inch wide, Load Bearing Equipment (LBE) waist belt 12. Attached to a front surface of the clip 10 is a MOLLE-compatible pouch 14. Upper and lower attachment straps 16, 18 of the pouch 14 are depicted partially in phantom outline.

Figure 4:
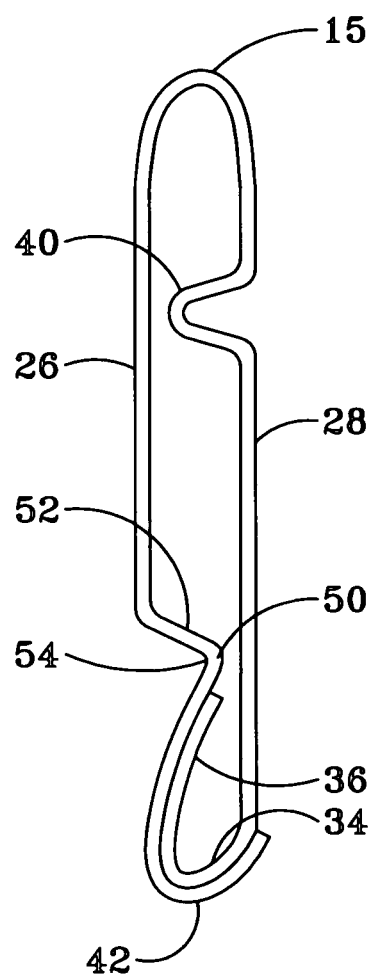
FIG. 4 is a right side, elevational view thereof.
Figure 5:
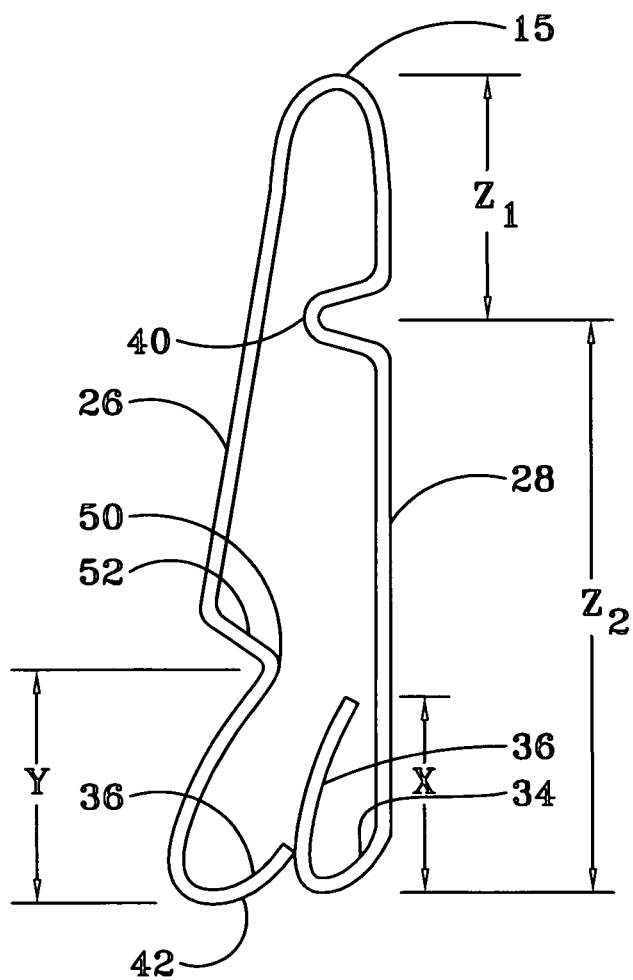
FIG. 5 is a right side, elevational view thereof, but depicted as unlocked.
Figure 6:
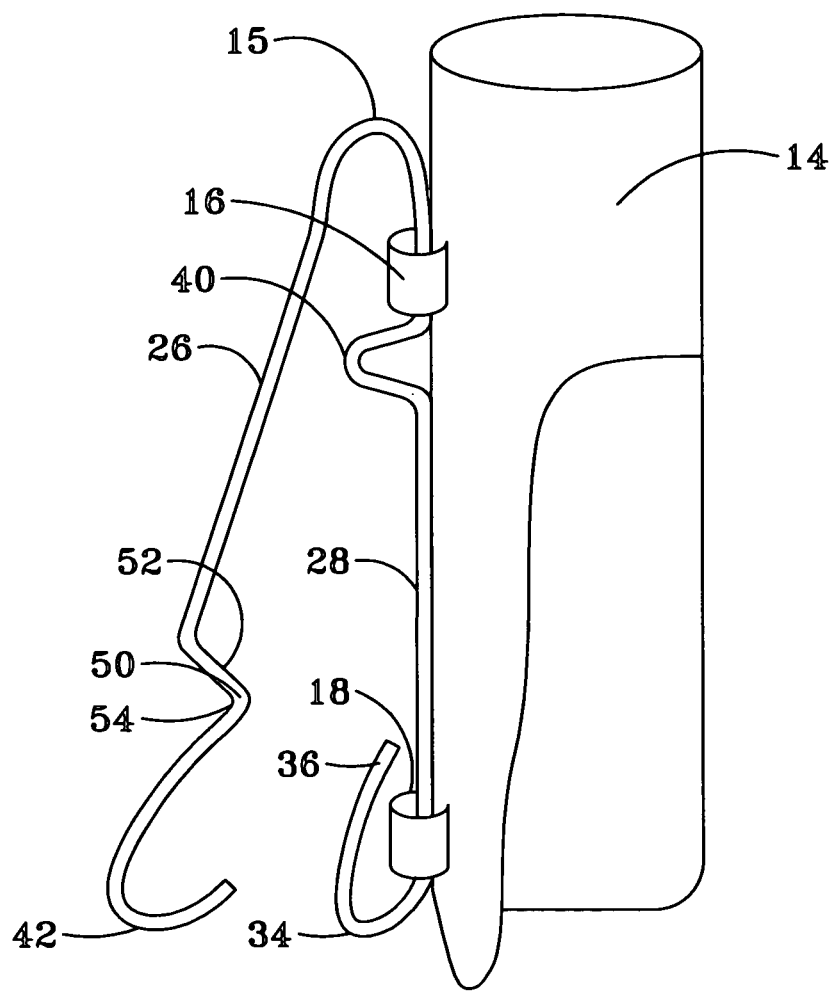
FIG. 6 is a right side, elevational view thereof, depicted as unlocked and attached to the MOLLE-compatible pouch of FIG. 1.
Figure 7:
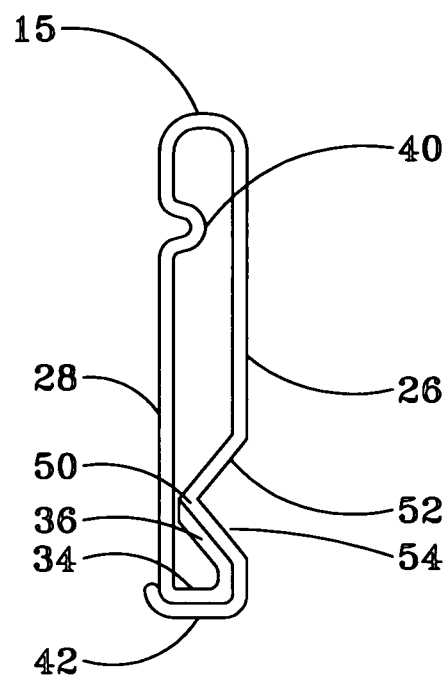
FIG. 7 is a right side elevational view of the first embodiment of the invention.
Figure 8:
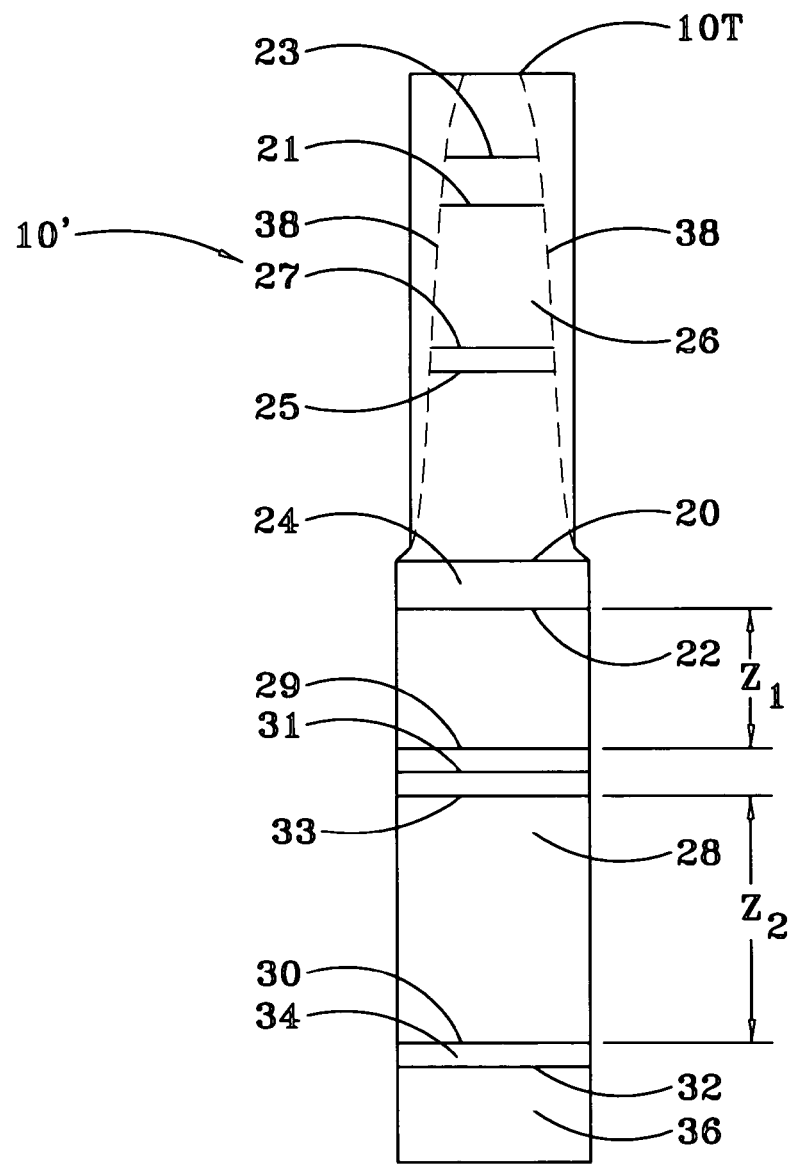
FIG. 8 is a plan view of a blank from which to form the first embodiment of the invention.

As shown in FIG. 8, the clip 10 is formed by bending a flat, thin, elongated, rectilinear blank 10' along four successive, transverse bend lines, as follows. At about four inches below a top end 10T of the blank 10' are a first bend line 20 and a second bend line 22 spaced about one-fourth inch apart, more or less, and the bending of the blank 10' at each of those bend lines through 90 degrees thereby forms a first bight 15 of the clip 10 and defines a rear panel 26 and a front panel 28 of the clip. Spaced below the first bight 15 about four inches is a third bend line 30, and about another one-fourth inch still farther away a fourth bend line 32. Bending of the blank 10' at each of the third and fourth bend lines 30, 32 through 90 degrees forms a second bight 34 of the clip 10, and further defines a forward, upturned hook or barb 36 of the clip 10. Peripheral portions of the rear panel 26 are then cut away along dashed lines 38 so that the top end 10T of the blank 10' has lesser width than the remainder of the blank. A forward-directed knee 50 is formed in the rear panel 26 about 2½ inches below the first bight 15 by bending a portion thereof angularly forward to form a first leg 52 thereof and bending a contiguous, adjacent portion angularly rearward to form a second leg 54 thereof. A lower end of the rear panel 26 is then likewise bent through 90 degrees at bend lines 21, 23, more or less, so that a third bight 42 thereby formed can resiliently deform to receive and engage in locking relationship the second bight 34 of the rear panel 26; see, for example, FIG. 4.

A transverse rib 40 is then formed in a rear surface of the front panel 28, as by bending or crimping, at about one inch below the first bight 15. The transverse rib 40 is dimensioned for frictional engagement with an LBE waist belt 10 sufficient to prevent the clip 10 from sliding along the belt.

Figures 14, 15:
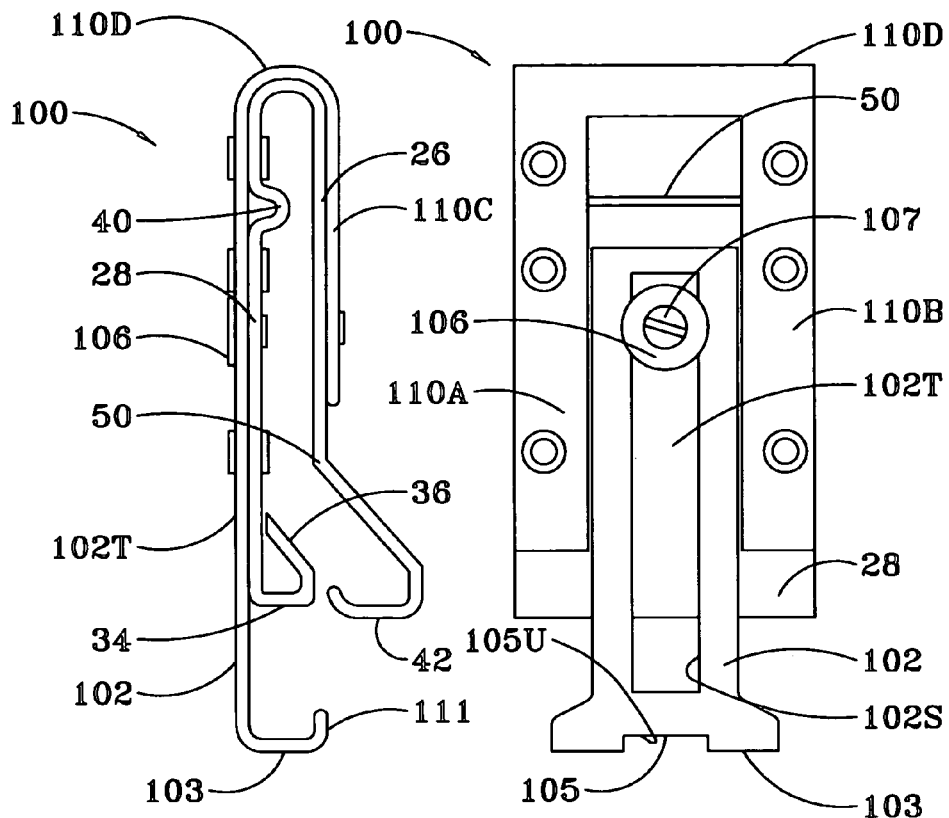
FIG. 14 is a right side, elevational view showing the keep thereof in an extended, unlocked position.
FIG. 15 is a front elevational view thereof.
Figure 16:
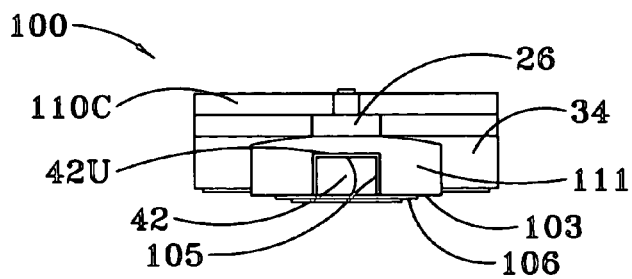
FIG. 16 is a bottom, plan view thereof.
Figure 18A:
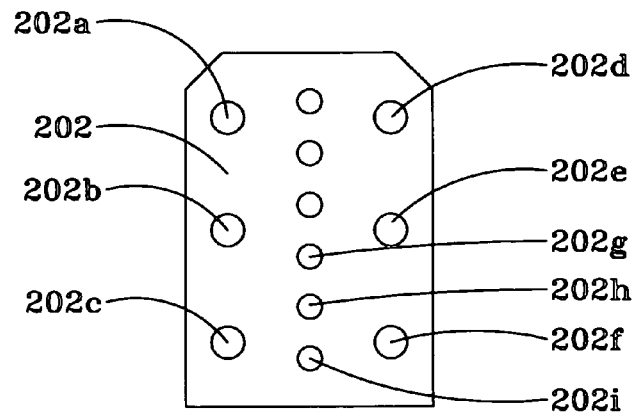
FIG. 18A is a front, elevational view of a base plate thereof.
Figures 17, 18C, 18E:
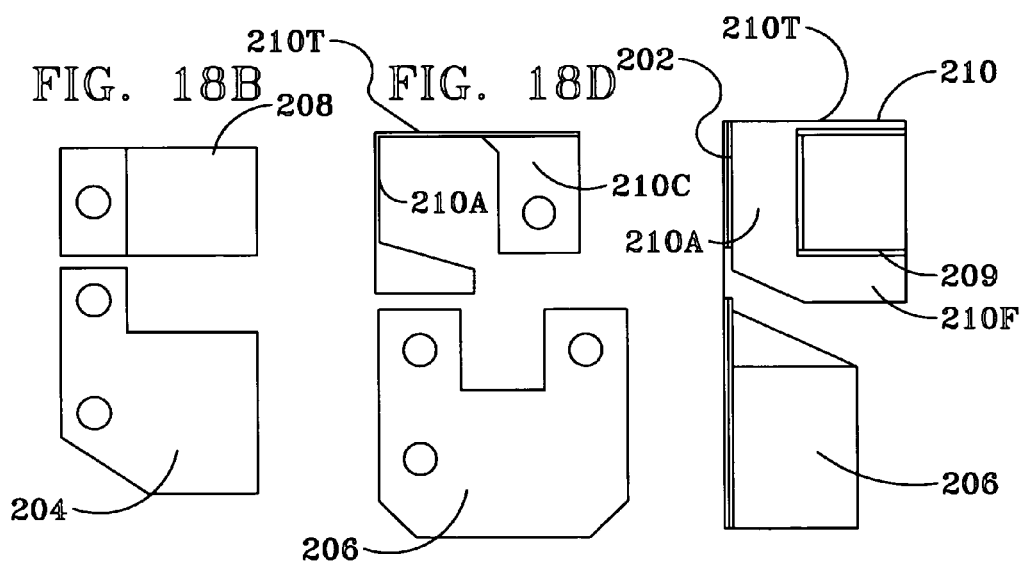
FIG. 17 is a left side, elevational view of a 6-inch flashlight holder that is attachable to the first and the second embodiments of the invention, depicted assembled.
FIG. 18C is a right side, elevational view of a lower, dual-tabbed scroll thereof.
FIG. 18E is a front elevational view of the dual-tabbed, lower scroll thereof.

FIGS. 9, 10A, 10B, 11-16 depict a second, double locking embodiment 100 of the belt clip of the present invention. The second embodiment 100 includes the first embodiment and adds thereto additional components that are overlaid upon the first embodiment and, in combination, provide a second lock, as described below. As may be best seen in FIGS. 11-16, a flat, thin, keep 102 is mounted to a front surface of the front panel 28 for sliding motion between a retracted, locked position and an extended, unlocked position. The extended, unlocked position of the keep 102 is depicted in phantom outline in FIG. 10B and in solid outline in FIGS. 14 and 15. The keep 102 comprises an elongated tongue 102T that extends from an upper end to a lower end thereof. A slot 102S having uniform width extends along the tongue 102T from near an upper end to near a lower end thereof. The slot 102S is closed at the upper and lower ends thereof by a transverse, upper member 102U and a transverse, lower member member 102L, respectively; FIG. 15. A cylindrical hub 104, depicted in vertical cross section in FIG. 11, having an external diameter slightly less than the width of the slot 102S protrudes from the front panel 28 through the slot 102S such that the tongue 102T is mounted to the front panel for sliding motion thereon as well as for pivoting motion about the hub. A washer 106 mounted on the hub 104 and over the slot 102S has external diameter larger than the width of the slot, whereby the keep 102 is retained on the clip 100. The washer 106 is retained on the hub 104 by a flat head screw 107 or by other suitable fastener. The keep 102 further comprises a fourth bight 103 at a lower end of the tongue 102T that is directed rearwardly, terminating in an upstanding flange 111, and is shaped and dimensioned to receive and partially surround the third bight 42 when the keep is in a retracted, closed position. As may be best seen in FIGS. 10A, 10B and 16, an opening 105 cut out of a central portion of the fourth bight 103 is dimensioned to receive the third bight 42 in close-fitting, surrounding engagement when the keep 102 is moved from an extended, open position to a retracted, closed position such that an upper margin 105U of the cut out 105 abuts an upper margin 42U of the third bight 42, thereby securing the third bight 42 against any inadvertent movement or dislodgement. That is, once the first embodiment 10 portion of the second embodiment 100 has been locked by moving the third bight 42 into overlying engagement with the second bight 34, movement of the keep 102 from an extended, unlocked position to a retracted, locked position doubly locks the clip 100.

The second embodiment further includes a flat, thin, guide plate 110 comprising a pair of laterally spaced-apart, parallel arms 110A, 110B disposed on opposite sides of the tongue 102T that extend along a front surface of the front panel 28 from lower ends to upper ends, thereof; a rear brace 110C that is attached to a rear surface of the rear panel 26; and a fifth bight 110D that joins said upper ends of the arms 110A, 110B to said rear brace. The arms 110A, 110B slidably engage the tongue 102T to constrain the tongue 102T against lateral movements and to permit movement of the keep 102 between its extended and retracted positions only.

Figure 9:
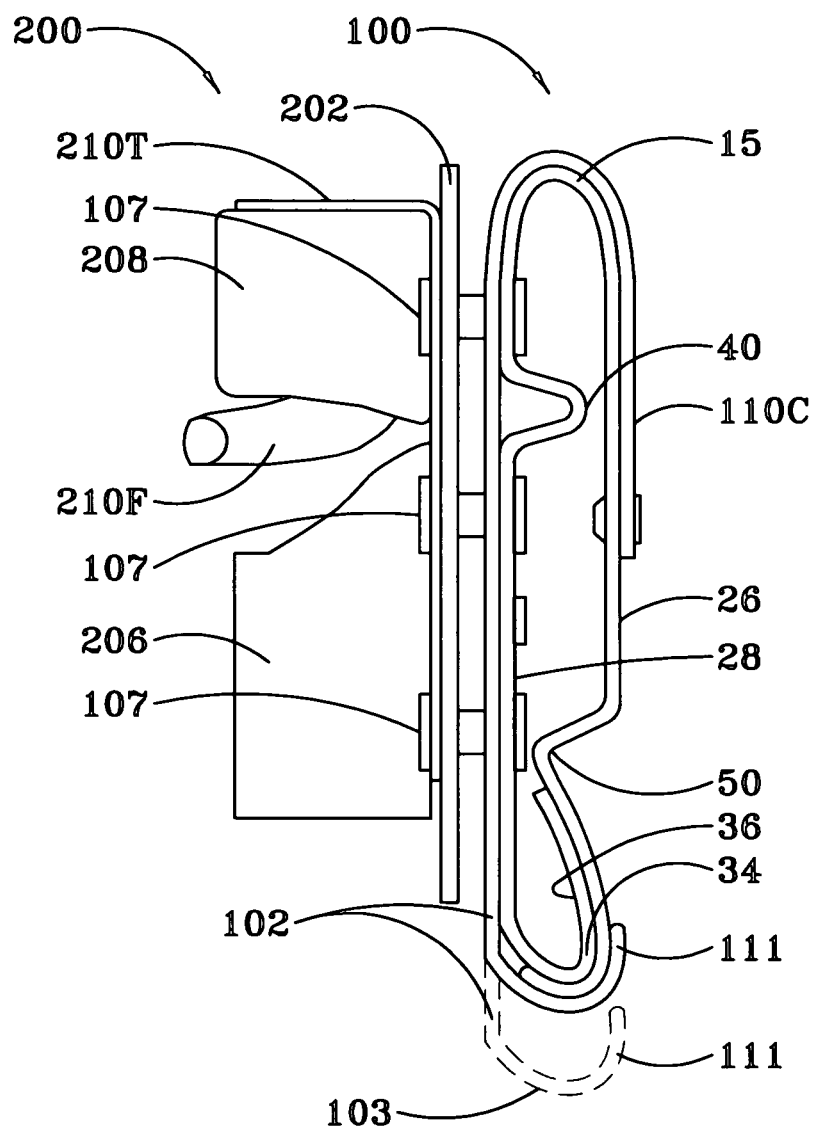
FIG. 9 is a left side elevational view of a second embodiment of the invention, depicted closed, and of a flashlight carrier accessory attached thereto, with the unlocked, extended position of the keep thereof shown in phantom outline.
Figure 10A:
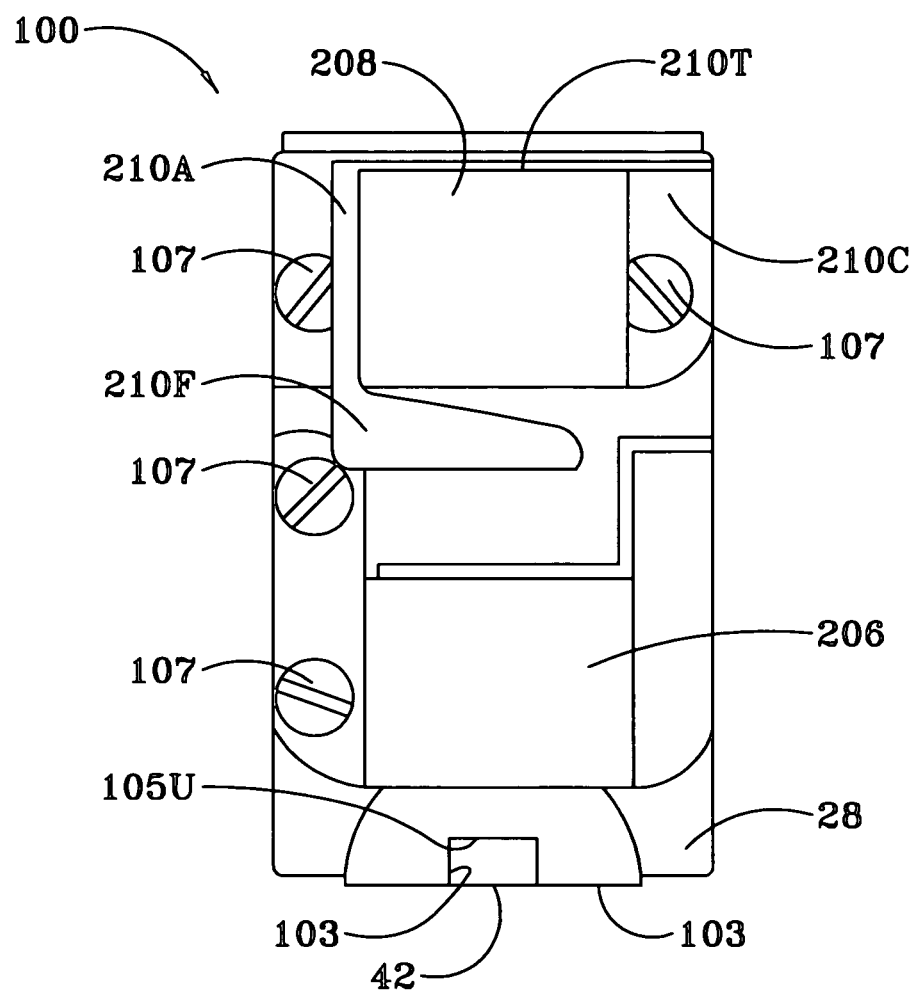
FIG. 10A is a front, elevational view thereof, removed from the flashlight carrier accessory.
Figure 10B:
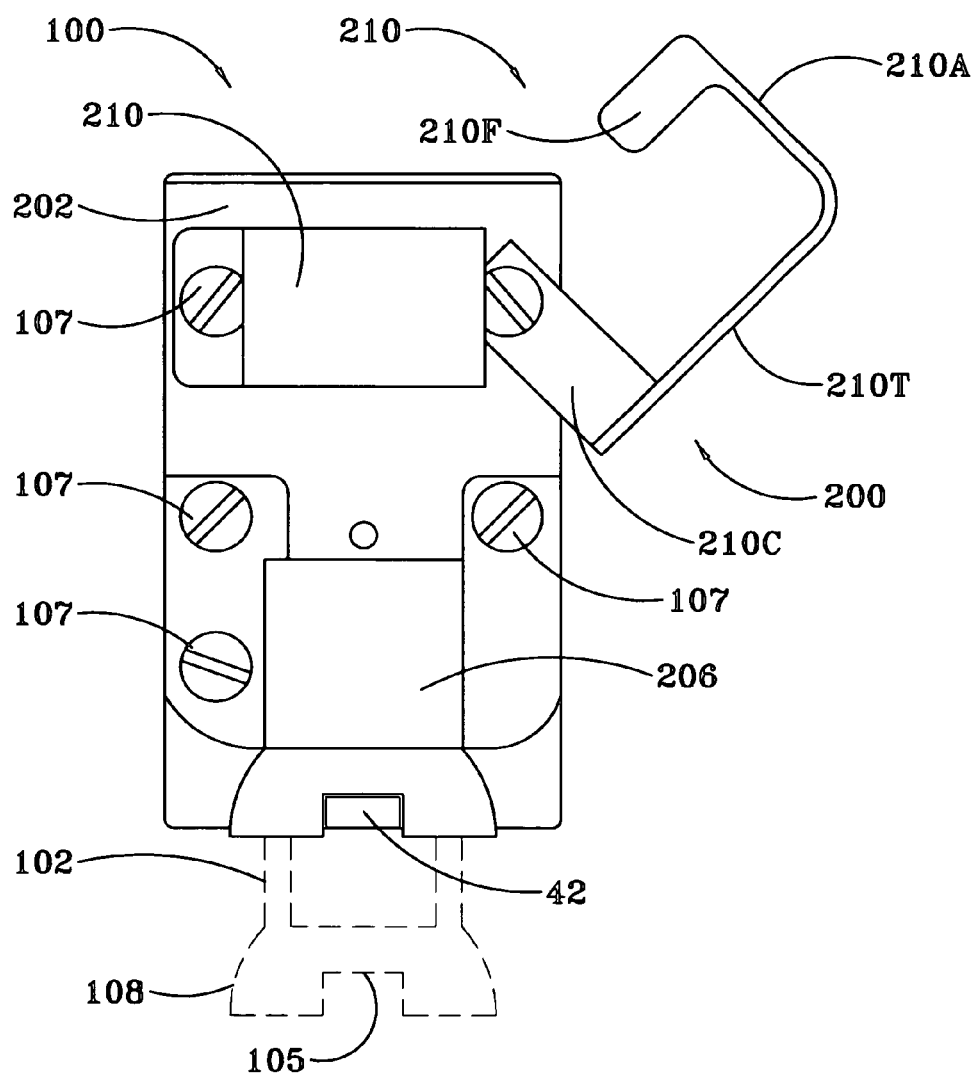
FIG. 10B is front, elevational view thereof, with its cap pivoted open, ready to receive a mini flashlight.

The invention further includes a mini flashlight carrier accessory 200 that is attachable to the front of both the first embodiment 10 and the second embodiment 100. FIGS. 9, 10A, 10B depicts a mini flashlight accessory 200 attached to the front of the second embodiment, and FIGS. 17, 18A-18E depict individual components parts thereof. The mini flashlight accessory 200 includes a flat, backing plate 202 having a plurality of apertures 202A. The backing plate 202 attaches to a front surface of the front panel 28 by screws or other fasteners inserted through said apertures. The accessory 200 further includes a single tabbed, lower scroll 204, a dual-tabbed, lower scroll 206 that fits coaxially over the single tab, lower scroll and has a pair of apertures that align with a pair of apertures on the single tab of the lower scroll cover, as well as a single apertures on an opposite tab. Fasteners (e.g., screws) insert through said apertures to attach the scrolls 204, 206 to a front surface of the front panel 28. The accessory 200 further includes an upper, single tabbed, scroll 208, the single tab of which has a single aperture for mounting it through aperture 202a to the backing plate 202. The lower scroll 204, dual-tabbed, lower scroll cover 206, and single-tabbed, upper scroll 208 are coaxial and dimensioned to receive and retain a six inch long mini flashlight therein. An upper scroll cover 210 is pivotally mounted to the backing plate 202 by a fastener through aperture 202d such that the cover moves between a retracted, closed, upper-scroll-208-covering position (FIG. 10A), wherein it is coaxial with the upper scroll 208, to an extended, swung-open position as depicted in FIG. 10B. The cover 210 includes an apertured tab 210C for attaching the cover to the mounting plate 202, a flat top 210T that extends forwardly at a right angle from a first end of the tab, an arm 210A having a first end attached to a second, opposite side of the top 210 and extends therefrom parallel to the tab, and a semicylindrical flange 210F attached to a second, opposite end of the arm. When closed, the flange 210F is coaxial with and immediately underlies a lower margin 209 of the upper scroll 208. The inner diameters of the scrolls 204, 208 and cover 210 are just slightly greater than the outer diameter of a 6 inch mini flashlight so as to easily but securely retain such a flashlight with the carrier accessory 200.

Figures 19, 20A, 20B, 20C, 20D:
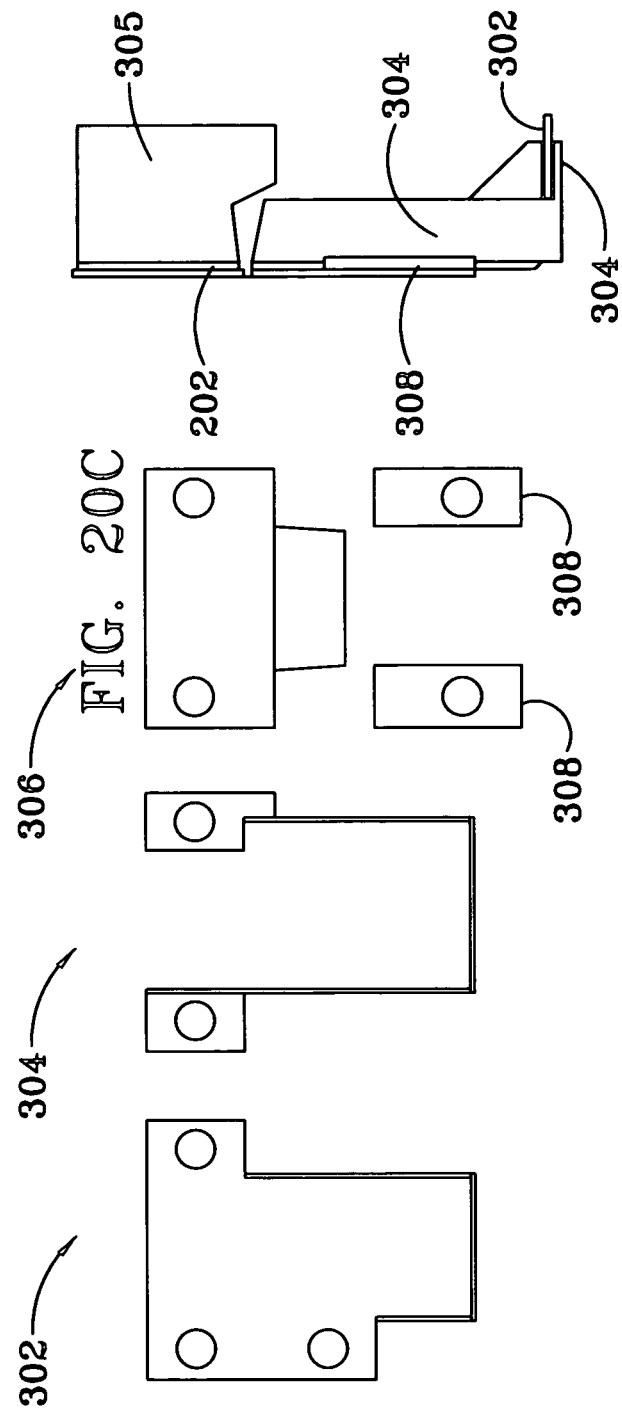
FIG. 19 is a left side, elevational view of a 3½-inch, mini flashlight holder that is attachable to the first and second embodiments of the invention, shown assembled.
FIG. 20A is front, elevational view of a cradle support thereof.
FIG. 20B is a tongue guide thereof.
FIG. 20C is front elevational view of an upper, dual-tabbed scroll thereof.
FIG. 20D is a pair of spacers thereof.

The present invention further includes a 3½ inch mini flashlight holder accessory 300 that is attachable to the front of the first embodiment 10 and of the second embodiment 100. Individual component parts of this accessory 300 are depicted disassembled in FIGS. 20A, 20B, 20C and 20D, and are shown assembled in FIG. 19. This accessory 300 includes a dual-tabbed, apertured, lower scroll 302, a dual-tabbed, apertured bracket 304, a dual-tabbed, apertured, upper scroll 306, and a pair of single-apertured spacers 308. The lower scroll 302 and upper scroll mount on the backing plate 202 with fasteners (e.g., screw) inserted through apertures 202b, 202c, 202e, coaxially with the scroll 306, which mounts by fasteners to apertures 202a, 202d of the backing plate. The two spacers 308 mount laterally spaced-apart to a front surface of the front panel 28, underneath the bracket 304.

The present invention further includes a nylon pouch attachment accessory 400 to facilitate attaching a nylon pouch to the first embodiment 10 or the second embodiment 100. As shown in FIGS. 22A, 22B and 22C, the nylon pouch attachment accessory includes an upper, dual-tabbed, apertured bracket 402, a lower, dual-tabbed, apertured bracket 404 and a cleat 406 that includes an upturned barb 406B at a lower end thereof. Screws or other fasteners (not shown) are inserted through apertures of the mounting plate 202 to attach these component parts of the accessory 400 to the mounting plate, as follows: through apertures 202a and 202d to attach the upper bracket 402; through apertures 202b, 202e to attach the lower bracket 404; and through apertures 202g, 202h, 202i to attach the cleat 406. With the mounting plate 202 attached to a front surface of the front panel 28, a nylon pouch (not shown) can be attached to this accessory 400 by suspending the two carry straps thereof from the upper bracket 402 and the cleat barb 406B, respectively.

The present invention further includes a leather pouch attachment accessory 500, the component parts of which are depicted separately in FIGS. 24A, 24B and 24C, and assembled in FIG. 23. The accessory 500 includes a dual tabbed, apertured bracket 502, and a pair of apertured spacers 504.

The present invention also includes a second leather pouch attachment 600, the component parts of which are depicted separately in FIGS. 26A, 26B, 26C, and are shown assembled in FIG. 25. The attachment 600 includes a flat, rear plate 602, a flat, front plate that mounts to a front surface of the rear plate, and a dual-apertured spacer 606. The spacer and upper portions of the rear and front plate attach to an upper portion of the mounting plate by fasteners that insert through apertures 202a, 202d; lower portions of the rear plate 602 and the front plate attach to the mounting plate by fasteners that insert through apertures 202b, 202e.

Although metal or various kinds of plastic may be used, the blank 10' and the component parts of the above-described accessories 200, 300, 400, 500 are preferably cut out of thermoplastic sheets of KYDEX®, available from Kydex LLC of Bloomsburg, Pa. KYDEX® is a registered trademark of Kydex LLC and designates a material comprised of synthetic, resinous compounds, which material provides the necessary strength, light weight, flexibility and resilience. KYDEX® is manufactured in a variety of colors that make its use in the clip 10, 100 and the accessories 200, 300, 400, 500 particularly suitable for various military and civilian applications of the clip. It will be understood, of course, that instead of forming the clip 10 of the present invention by bending and trimming a blank 10' in the manner described above, KYDEX® (or some other suitable, moldable material) in the form of powders and/or pellets may be molded to form either or both of the first and second embodiments 10, 100 as well as to form the accessories 200, 300, 400, 500 (except, perhaps, for the fasteners thereof).

Thus, it should be evident that a lockable clip for attaching MOLLE-compatible pouches and accessories to a Load Bearing Equipment (LBE) waist belt according to the concepts of the present invention has been shown and described in sufficient detail to enable one of ordinary skill in the art to practice the invention. Since various modifications in detail, materials, arrangements of parts, and equivalents thereof, are within the spirit of the invention herein disclosed and described, the scope of the invention should be limited solely by the scope of the appended patent claims.

I claim:

1. A double-locking clip formed from a resilient material for attaching MOLLE-compatible pouches and accessories to a Load Bearing Equipment (LBE) waist belt having a width W, comprising:
    a front panel that extends from an upper end to a lower end thereof a distance greater than W;
    a rear panel that extends from an upper end to a lower end thereof a distance greater than W; and
    a bight portion that joins the upper end of the front panel to the upper end of the rear panel, said bight portion being dimensioned to permit the clip to be mounted upon and straddle said Load Bearing Equipment waist belt; and
    wherein
        the front panel includes a lower end portion that is bent rearwardly to form a second bight and extends upwardly from the second bight a distance X, thereby forming a barb;
        the rear panel includes
            a lower end portion that terminates in a forwardly and upwardly bent third bight, said third bight being dimensioned and disposed to receive in surrounding engagement the second bight and the barb when the lower end portion of the front panel is pressed rearwardly into engagement with the lower end portion of the rear panel; and
            a knee portion, said knee portion extending forwardly toward the front panel and being located a distance Y from the third bight, such that Y is greater than X;
        whereby, to lock the clip, the lower end portion of the front panel is pressed rearwardly against the lower end portion of the rear panel, which causes the third bight to resiliently deform sufficiently to permit the second bight to enter into and be captured by the third bight, whereas, to unlock the clip, the third bight is pressed down to resiliently deform it while simultaneously pulling the front panel forward, whereupon the second bight is released from the third bight;
        a keep mounted to a front surface of the front panel for sliding motion thereon between an upper, retracted position and a lower, extended position, said keep including
            a flat, elongated, tongue portion having uniform width and extending from an upper end to a lower end thereof, said tongue having an elongated slot having uniform width and extending from said upper end to said lower end, said slot being closed at said upper end and at said lower end by upper and lower transverse members of the tongue, respectively;
            a fourth bight, wherein said fourth bight is rearwardly-directed, contiguous with said lower end of said tongue portion, and shaped and dimensioned to receive in surrounding engagement the third bight when the keep is moved from said extended, open position to said retracted, closed position;
            a hub attached to the front plate, which hub protrudes through the slot;
            a guide plate, said guide plate including a parallel pair of laterally spaced-apart, parallel arms disposed on opposite sides of the tongue and attached to a front surface of the front plate;
        and
            a disk-shaped retainer attached to said hub, said tongue being slidably disposed and retained between said retainer and the front surface of the front panel;
        whereby, when the second bight is within the third bight and the keep is in an open, extended position, sliding the keep upward to a retracted, closed position doubly locks the clip, whereas, sliding the keep down from the retracted, closed position returns the clip back to a singly-locked condition.

2. The clip of claim 1, wherein the knee portion is formed in the rear panel by bending a portion thereof angularly forward to form a first leg thereof, and bending a contiguous, adjacent portion thereof angularly rearward to form a second leg thereof.

3. The clip of claim 2, wherein the front panel includes a transverse rib that extends toward the rear panel, the rib is shaped and dimensioned to frictionally bear against, and inhibit the clip from sliding along, said Load Bearing Equipment waist belt whenever said clip is mounted thereon.

4. The clip of claim 3, wherein the transverse rib and the first bight are spaced apart at least two inches in order to permit insertion of a two-inch wide, upper strap of a MOLLE-compatible pouch or accessory between said rib and said bight.

5. The clip of claim 4, wherein the transverse rib and the second bight are spaced far enough apart to permit insertion of a two-inch wide, lower strap of a MOLLE-compatible pouch or accessory between the front panel and the barb, said lower strap being spaced 1.75 inches below said upper strap.

6. The clip of claim 5, wherein said width W of said Load Bearing Equipment waist belt is in the range of 1 to 2.25 inches.

7. The clip of claim 1, wherein the guide plate further includes
a rear brace attached to a rear surface of the rear plate and a fifth bight that joins the parallel arms of the guide plate to the rear brace.

8. The clip of claim 1, wherein the third bight has a centrally-disposed cutout that is shaped and dimensioned to receive in surrounding engagement the second bight when the tongue is in a retracted, closed position.

9. The clip of claim 1, wherein the guide plate has a centrally-disposed cutout that is shaped and dimensioned to receive in surrounding engagement the second bight when the tongue is in a retracted, closed position, and the guide plate further includes a rear brace attached to a rear surface of the rear plate and a fifth bight that joins the parallel arms of the guide plate to the rear brace.

10. The clip of claim 1, wherein the hub is cylindrical and has an external diameter less than the width of the slot, the disk-shaped retainer is a washer mounted on the hub, and said washer has external diameter greater than the width of the slot.

* * * * *